United States Patent
Seale et al.

(10) Patent No.: US 8,520,468 B2
(45) Date of Patent: *Aug. 27, 2013

(54) METHOD AND SYSTEM FOR CONTROLLING STREAMERS

(75) Inventors: Daniel B. Seale, New Orleans, LA (US); John Edward Grant, Livingston (GB); David A. Cespedes M., Metairie, LA (US)

(73) Assignee: ION Geophysical Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,001

(22) Filed: Jul. 16, 2012

(65) Prior Publication Data

US 2012/0281498 A1    Nov. 8, 2012

Related U.S. Application Data

(63) Continuation of application No. 12/613,617, filed on Nov. 6, 2009, now Pat. No. 8,223,585.

(60) Provisional application No. 61/112,429, filed on Nov. 7, 2008.

(51) Int. Cl.
    *G01S 1/38*    (2006.01)
(52) U.S. Cl.
    USPC ............................................. 367/19; 367/16
(58) Field of Classification Search
    USPC ....................................................... 367/15–19
    See application file for complete search history.

(56) References Cited

U.S. PATENT DOCUMENTS

| 6,691,038 | B2 | 2/2004 | Zajac |
| 7,092,315 | B2 | 8/2006 | Olivier |
| 7,423,929 | B1 | 9/2008 | Olivier |
| 8,223,585 | B2 * | 7/2012 | Seale et al. ...................... 367/19 |
| 2003/0012083 | A1 | 1/2003 | Brunet |
| 2006/0227657 | A1 | 10/2006 | Tveide et al. |
| 2009/0003129 | A1 | 1/2009 | Stokkeland et al. |
| 2009/0003135 | A1 | 1/2009 | Mellier et al. |
| 2009/0141587 | A1 | 6/2009 | Welker et al. |

FOREIGN PATENT DOCUMENTS

| WO | 98/28636 A1 | 7/1998 |
| WO | 02/103393 A2 | 12/2002 |
| WO | 2005/096018 A1 | 10/2005 |

OTHER PUBLICATIONS

Written Opinion of the International Searching Authority and International Search Report for PCT/US09/63474, mailed , European Patent Office, Rijswijk, NL.

Musser, Guillot, and Bouligny, "DIGIFIN—Next Wave of Streamer Control & Positioning," Dec. 13, 2007, ION Geophysical Corporation, Stafford, Texas, U.S.A.

"ORCA Data Sheet," Concept Systems Ltd., Edinburgh, Scotland.

* cited by examiner

*Primary Examiner* — Ian Lobo
(74) *Attorney, Agent, or Firm* — James T. Cronvich

(57) ABSTRACT

A method and system for controlling the shape and separation of an arrangement of streamers towed behind a survey vessel. Each streamer is steered laterally by lateral steering devices positioned along its length at specific nodes. Each streamer is driven by its lateral steering devices to achieve a specified separation from a neighboring streamer. One of these actual streamers, used as a reference by the other actual streamers, is steered to achieve a specified separation from an imaginary, or ghost, streamer virtually towed with the actual streamers.

10 Claims, 5 Drawing Sheets

METHOD AND SYSTEM FOR CONTROLLING STREAMERS

CROSS-REFERENCE

This application is a continuation of U.S. patent application Ser. No. 12/613,617, "Method and System for Controlling Streamers," filed Nov. 6, 2009, now U.S. Pat. No. 8,223,585, which claims priority to U.S. Provisional Patent Application Ser. No. 61/112,429, filed Nov. 7, 2008. Both prior applications are incorporated by reference.

BACKGROUND

The invention relates generally to offshore marine seismic prospecting and, more particularly, to systems and methods for controlling the spread of towed seismic streamers.

In the search for hydrocarbon deposits beneath the ocean floor, a survey vessel 10, as shown in FIG. 1, tows one or more seismic sources (not shown) and one or more streamer cables $S_1$-$S_4$ instrumented with hydrophones and other sensors. In multiple-streamer systems, the streamers are towed underwater behind the survey vessel in a generally parallel arrangement. The tail end of each streamer is tethered to a tail buoy 11 that marks its position. The seismic source periodically emits a seismic wave that propagates into the ocean floor and reflects off geologic formations. The reflected seismic waves are received by the hydrophones in the streamers. The hydrophone data is collected and later processed to produce a map of the earth's crust in the survey area.

The quality of the survey depends on, among other things, knowledge of the precise position of each hydrophone. Position sensors, such as heading sensors and acoustic ranging devices 12, located along the lengths of the streamers are used to determine the shapes of the streamers and their relative separations. The acoustic ranging devices are typically acoustic transceivers operating on a range of channels over which they transmit and receive acoustic ranging signals to and from one another to produce accurate ranges 14 between their locations on the streamers. The many ranges—only a few are shown in FIG. 1—and streamer heading data from the many heading sensors are used to compute a network solution that defines the shapes of the individual streamers and their relative positions. When one point on the streamer array is tied to a geodetic reference, such as provided by a GPS receiver, the absolute position of each hydrophone can be determined.

Positioning devices, such as depth-keeping birds and lateral steering devices 16 located at nodes along the lengths of the streamers, are used to control the depths of the streamers and their separations from each other. The positioning devices could be equipped with acoustic ranging devices to range with other positioning devices so equipped and with dedicated acoustic ranging devices. Precise positioning of the streamers is important during online survey passes to produce a high-quality map. Cross currents, however, cause the streamers to deviate from straight lines parallel to the towing vessel's course. Instead, the streamers may angle straight from their tow points or assume a curved shape with their tail ends tailing away from the straight lines. This feathering of the streamers is often undesirable in online survey passes. Precise positioning is also important during turns between online survey runs to reduce the time of the turn without entangling the streamers.

In conventional streamer positioning systems, one of the streamers, outermost port streamer $S_1$ in this example, is used as a reference streamer. A shipboard controller 18 collects the position sensor data and computes the network solution representing the shapes of the streamers and their separations from each other. From the network solution and the target separations of corresponding steering-device nodes on the streamers referenced directly or indirectly to points on the reference streamer, the shipboard controller derives steering commands for each lateral steering device. The steering commands are transmitted to the steering devices to adjust their control planes, or fins, to drive the streamers laterally, as indicated by arrows 20, to maintain the target separations.

In current systems, a human operator steers the reference streamer by sending lateral steering commands to the lateral position controllers to drive the reference streamer to adjust feather. The other streamers are then automatically steered toward the selected separations referenced directly or indirectly from the reference streamer. But the manual positioning of the reference streamer is time-consuming and, in turns, can be hectic as well.

SUMMARY

This shortcoming and others are addressed by a system embodying features of the invention for controlling the spread of a plurality of streamers towed behind a survey vessel. The system comprises a plurality of actual streamers towed by a survey vessel and having head ends laterally offset from each other. Each actual streamer has a plurality of lateral steering devices and position sensors disposed along its length. A controller receives position data from the position sensors and determines the shapes and positions of the actual streamers from the position data. The controller calculates the shape and position of an imaginary streamer towed by the survey vessel and further calculates lateral separations for each of the actual streamers referenced to the shape and position of the imaginary streamer. The controller sends lateral steering commands to the lateral steering devices corresponding to the calculated lateral separations.

In another aspect of the invention, a method for controlling the spread of N actual streamers $S_1$-$S_N$ towed in the water behind a survey vessel and equipped with lateral steering devices at spaced apart locations along the lengths of the actual streamers comprises:
(a) defining the shape and position of an imaginary streamer $G_r$; (b) determining the shapes and positions of actual streamers $S_1$-$S_N$; (c) sending lateral steering commands to lateral steering devices on actual streamer $S_r$ to adjust the separation in the water of actual reference streamer $S_r$ from imaginary streamer $G_r$; and (d) sending lateral steering commands to lateral steering devices on actual streamer $S_n$ to adjust the separation in the water of actual reference streamer $S_n$ from another actual streamer $S_i$, for every $n \in \{1, 2, \ldots, N\}$ and $n \neq r$ and wherein $i \in \{1, 2, \ldots, N\}$, $i \neq n$, and, in at least one case, $i = r$.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
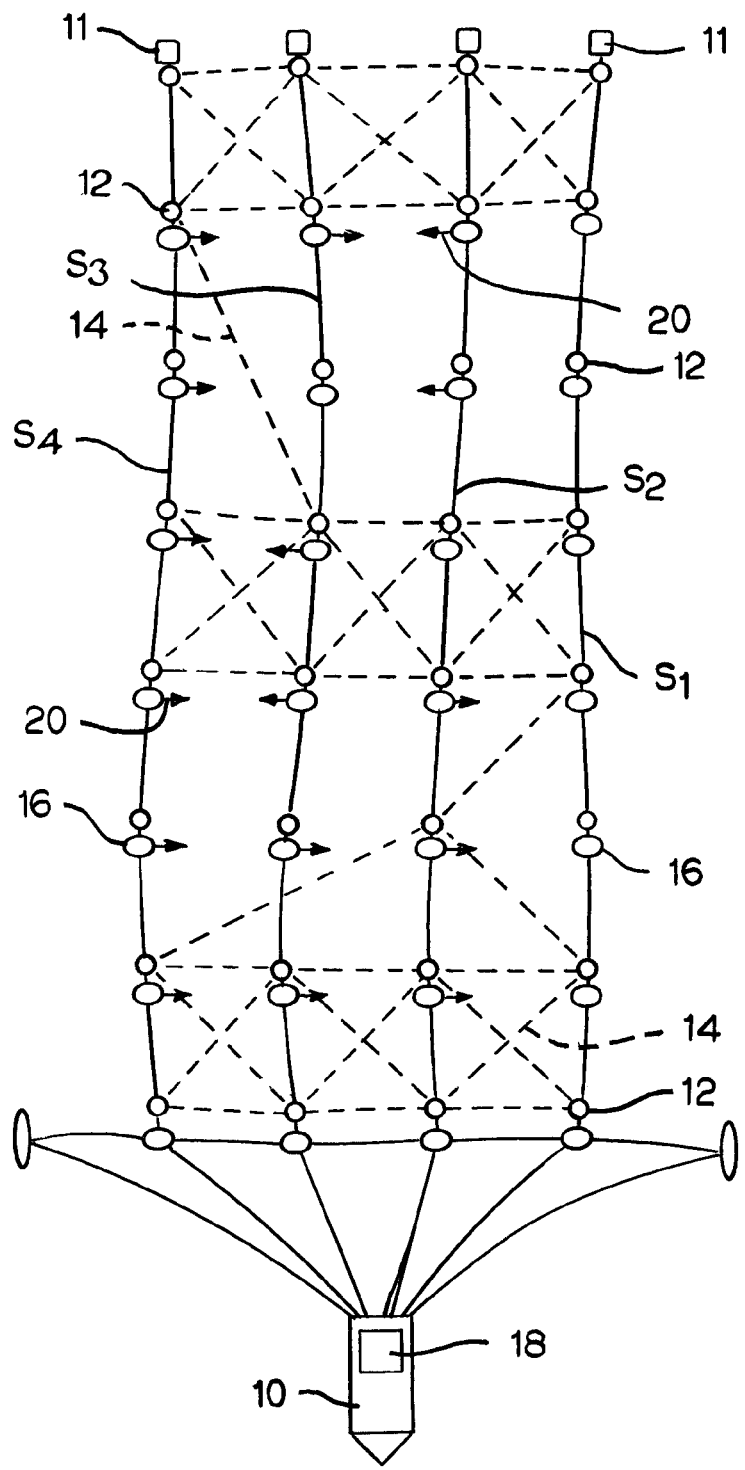
FIG. 1 is a top plan view of a survey vessel towing a steamer network illustrating conventional acoustic cross-bracing and lateral steering of streamers using a reference streamer.

The operation of a streamer steering system according to the invention is described with reference to an exemplary four-streamer system shown in FIG. 2. (The streamer arrangement is the same as that in FIG. 1.) A survey vessel 10 tows four streamers $S_1$-$S_4$ (generally, $S_1$-$S_N$ for an N-streamer system) whose tail ends 22 are tethered to tail buoys 11. Head ends 23 of the streamers are attached to a system of tow cables and tethers 24 attached to the rear deck of the vessel. Paravanes 26 are used to maintain a wide spread for the deployed streamer network. Lateral steering devices 16—disposed at spaced apart locations, or steering nodes, e.g., every 300 m, along the length of each streamer—exert lateral forces 20 to drive the streamer to starboard or port. A shipboard controller 28 connected to the position sensors and the lateral steering devices and the streamers by a communications link, such as a hardwired link 30 running along the tow cables and through the streamers, receives positioning and other data from the position sensors and transmits steering commands to the lateral steering devices over the link.

Figure 2:
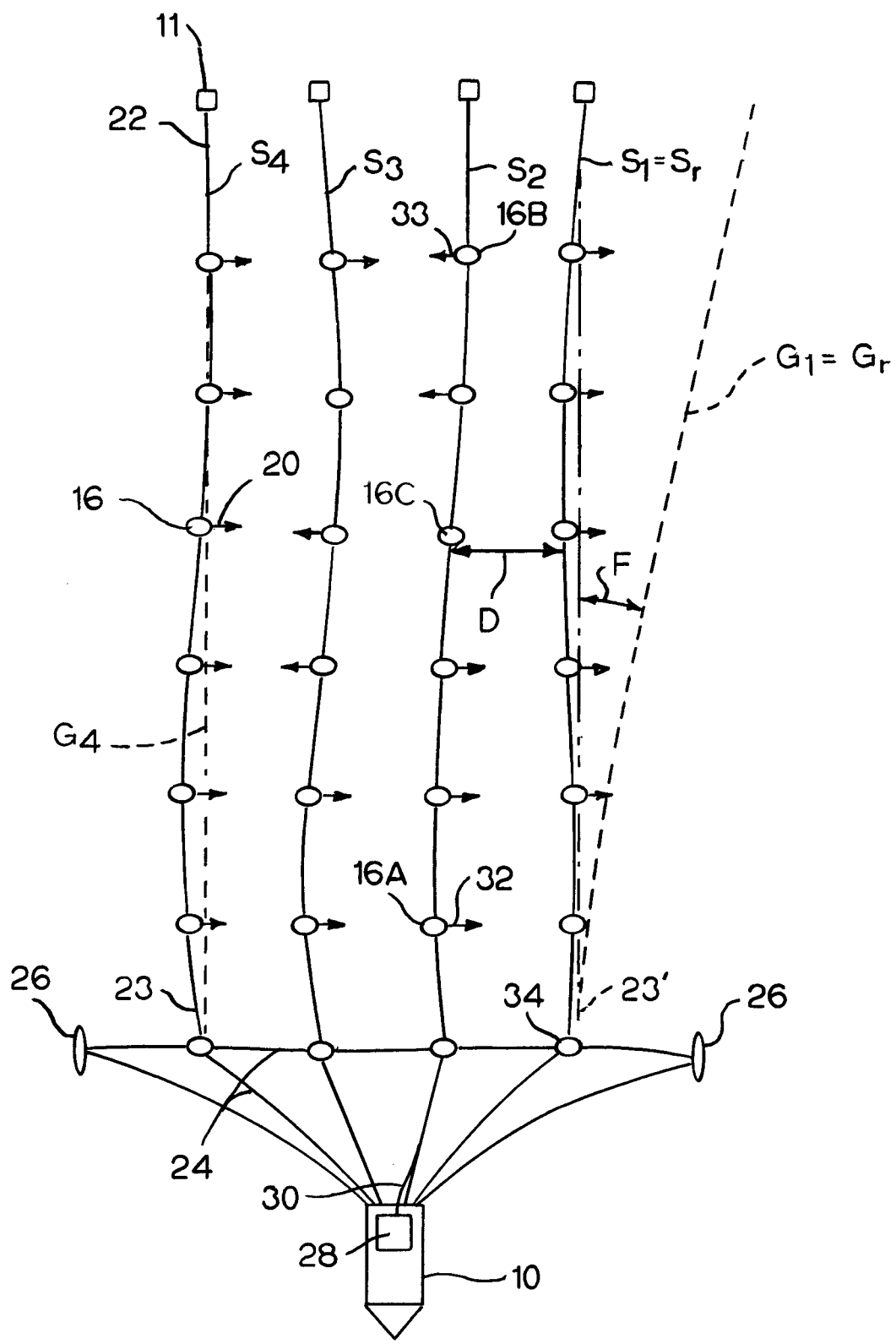
FIG. 2 is a top plan view as in FIG. 1 illustrating the use of a virtual streamer to which a reference streamer is referred, according to the invention.

Just as for the streamer system of FIG. 1, the system of FIG. 2 designates one streamer—outermost port streamer $S_1$ in this example—as a reference streamer $S_r$. The closest neighboring streamer $S_2$ is steered toward a selected separation D from the reference streamer $S_1$. As shown in FIG. 2, the node for head-end lateral steering device 16A on streamer $S_2$ is farther away from the distance of closest approach to reference streamer $S_1$ than the selected separation. Consequently, the shipboard controller issues a steering command to the head-end steering device 16A to drive the streamer to port, as indicated by arrow 32. Because the tail-end steering node for steering device 16B on streamer $S_2$ is closer to the distance of closest approach to reference streamer $S_1$ than the selected separation, as shown in FIG. 2, the shipboard controller issues the steering command to the tail-end lateral steering device 16B on $S_2$ to force the streamer to starboard, as indicated by arrow 33. The steering commands contain, for example, control values, such as fin angle values related to the separation error calculated from the desired target separation and the actual separation between the node on the streamer at which the lateral steering device is located and the nearest point on a streamer to which it is referenced. The lengths of the arrows 32, 33 are proportional to the magnitudes of the changes in the fin angle settings, which control the azimuth of the control surfaces of each lateral steering device. Because streamers $S_1$ and $S_2$ are at the desired separation D about midway along their lengths in FIG. 2, the fin angle setting for lateral steering device 16C does not have to change.

Just as streamer $S_2$ is steered directly referenced to the shape and position of reference streamer $S_1$, $S_2$'s starboard neighbor $S_3$ is steered referenced to the position and shape of $S_2$. And outermost starboard streamer $S_4$ is positioned relative to $S_3$. This is a preferred mode of operation because the ranges between closely spaced, adjacent streamers as derived from the acoustic ranging devices are typically more accurate than those between farther apart, non-adjacent streamers. In this example, each of the streamers $S_2$-$S_4$ is steered to maintain a desired separation from its port neighbor. Reference streamer $S_1$ thus serves as a direct reference for streamer $S_2$ and as an indirect reference for the other streamers.

In one conventional version of a streamer steering system, the reference streamer $S_1$ is steered by a human operator giving manual commands via the shipboard controller to adjust the feather of the reference, which causes the streamer to assume a corresponding shape and position. According to the invention, the positioning of the reference streamer is automated by referencing it to a pre-defined imaginary streamer $G_r$. This imaginary, or virtual, or ghost streamer is defined through the shipboard controller according to selectable criteria, such as target feather. Once the criteria are selected, the shipboard controller automatically drives the reference streamer $S_r$ to assume a pre-selected separation, which could be zero, from the ghost streamer $G_r$. (In FIG. 2, r=1.) The other streamers $S_2$-$S_4$ are steered conventionally as already described. As shown in FIG. 2, the ghost streamer $G_1$ is selected with its head end 23' coincident with the tow point 34 of reference streamer $S_1$. In this example, $G_1$ is also shown with a certain amount of feather F. (But $G_1$ could alternatively be selected to be deployed straight behind the vessel or offset from the tow point of $S_1$.)

Generally, for a system of N actual streamers $S_1$-$S_N$, one of the streamers is designated a reference streamer $S_r$. In a preferred arrangement, r=1 or N to designate an outermost port or starboard streamer, $S_1$ or $S_N$, for streamers consecutively positioned from port to starboard $S_1$-$S_N$. The associated ghost streamer is then $G_1$ or $G_N$. If the reference ghost streamer $G_r$=$G_1$, then actual streamer $S_1$ is referenced to $G_1$, and $S_n$ is referenced to $S_{n-1}$ for every n∈{2, 3, ..., N}. More generally, if the reference streamer $S_r$ is referenced to ghost streamer $G_r$, then actual streamer $S_n$ will be referenced to another actual streamer $S_i$ for every n∈{1, 2, ... N} and n≠r, and wherein i∈{1, 2, ..., N}, i≠n, and, in at least one case, i=r.

Figure 3:
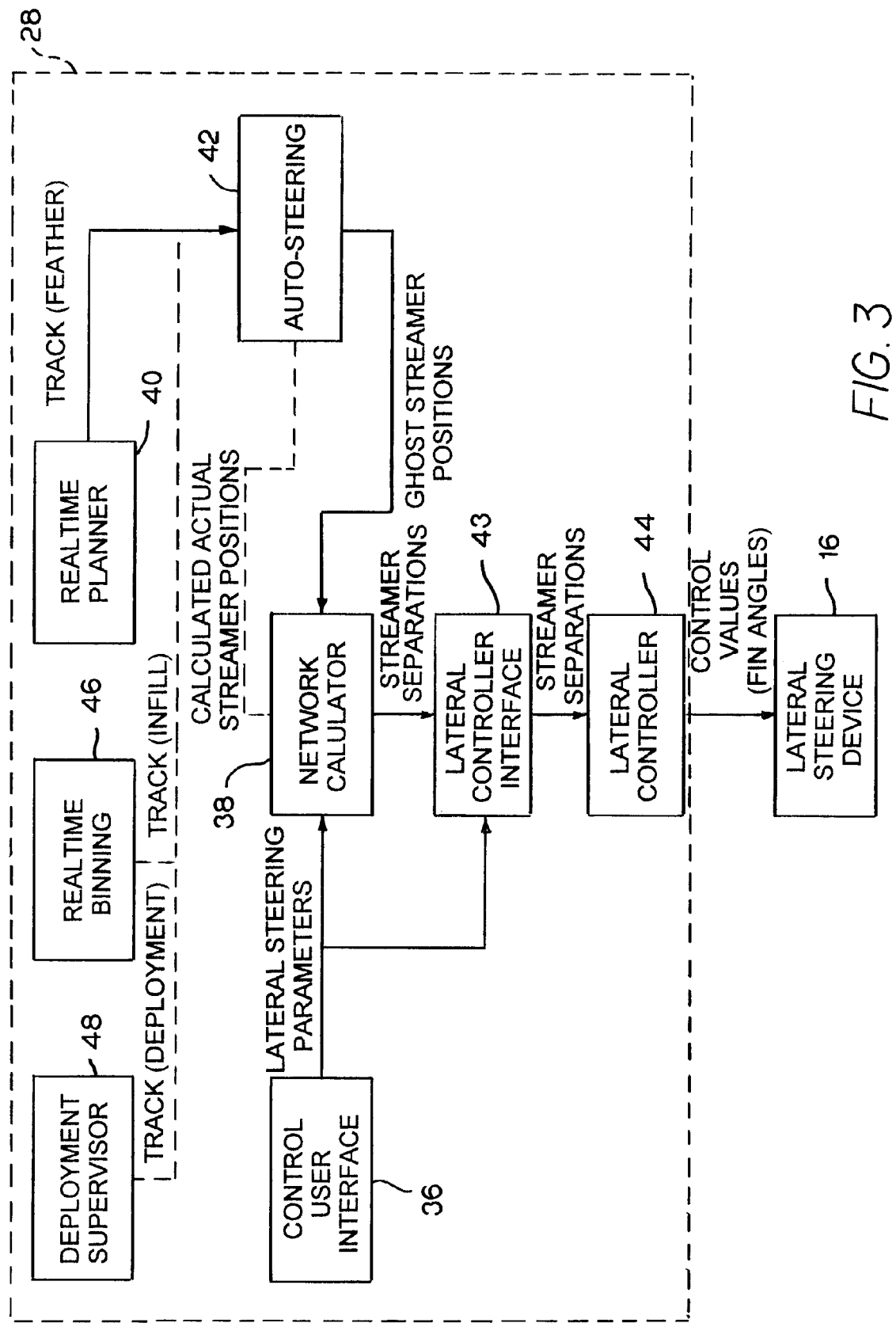
FIG. 3 is a block diagram of the streamer positioning control system usable with the streamer network of FIG. 2.

A block diagram of the streamer steering control system is shown in FIG. 3. The shipboard controller, which may comprise one or more processors, executes a number of individual processes to control the shape and separations of the streamers. A control user interface 36 allows an operator to set various lateral steering parameters. The parameters may include:
 a) Ghost Streamer ON/OFF—enables or disables steering of the reference streamer to the ghost streamer;
 b) Reference Streamer—selects which streamer to use as the reference streamer $S_r$ during automatic separation control of the streamers;
 c) Max Fin Angle for $S_r$—maximum value of the fin angle to be used on the reference streamer during online operation (to limit bias in the fin angle control range and to limit flow noise due to lateral displacement of the streamer);
 d) Mode—sets the online operating mode (fan mode or even spacing mode for streamer shape and separation); and
 e) Feather—manual setting of the desired feather for a 3D survey line.

Some of these parameters are sent to a network calculator means 38 that calculates the current positions of all the actual streamers $S_1$-$S_N$. (As used in this description and in the claims, "position" means position and shape of the streamer, except when explicitly used with "shape.") The network calculator then calculates the separations between the actual streamers and their corresponding target streamers.

During a typical survey, a realtime planner 40 defines the track the vessel is to follow. Each track consists of a series of turns followed by online passes. The planner defines online shot points along the online portion of the track and at the ends of the turns and offline vessel positions during the remainder of the turns. In a 3D survey, the final target feather value coming out of a turn is the value manually entered via the control user interface. In a 4D survey, target feather angles are set and adjusted along the survey line based on feather angles recorded during the baseline survey the new survey is designed to replicate.

The realtime planner sends the computed track setting, which includes the association of feather matching, to an auto-steering means 42, which calculates the required future positions of the ghost streamers. The auto-steering means is a process that computes the range and bearing from each positioning-sensor node, as well as from the nodes for other devices, on each streamer to the distance of closest approach to that streamer's target streamer, whether another actual streamer or a virtual, or ghost, streamer associated with the actual streamer. The auto-steering process also computes the shape and position of the ghost streamer $G_1$, for example, to which the reference streamer $S_1$ is referenced. The auto-steering process can also optionally compute the ghost streamers $G_2$-$G_N$ associated with each of the other actual streamers $S_2$-$S_N$ from the calculated actual streamer positions received from the network calculator. (See FIG. 2 for an example of one of the other ghost streamers $G_4$, shown with no feather for the purposes of illustration.) This allows the ghost and reference streamers to be changed from the outermost port streamer to the outermost starboard streamer, for example. The auto-steering process updates the ghost streamer's shapes and positions at a generally regular interval in turns and offline and, typically, once per shot online.

A lateral steering interface 43 receives the streamer separation values and, under the control of the control user interface, passes them along to a lateral controller 44 that converts the streamer separation values for each node into streamer steering commands, including, for example, fin angle commands, and transmits them over the communications link 30 to the lateral steering devices 16, which appropriately adjust their fin angles.

Sometimes during an online pass, strong currents or navigation or instrumentation problems can cause the streamer spread to inadequately cover the survey area. The survey area is divided into a gridwork of bins. If an insufficient amount of data is collected in some of the bins, the pass will have to be re-run, at least in part, to fill in those bins with more data. The process of re-running parts of online passes in subsequent online passes to complete the data set is known as infill. A realtime binning supervisor process 46 monitors the bins during a line and adjusts the spread of the streamers to minimize the amount of infill needed. The required track derived form the binning data to meet the infill requirements is sent to the auto-steering process, which then calculates a corresponding ghost streamer for the pass.

Another process is used to supervise the spread of the streamer system during deployment by helping to automate the distribution of streamer separations as the streamers are payed out from the back deck of the survey vessel. A deployment supervisor 48 sends track and deployment data to the auto-steering process, which calculates the ghost streamer position for the network calculator to control the lateral steering devices.

Figure 4A:
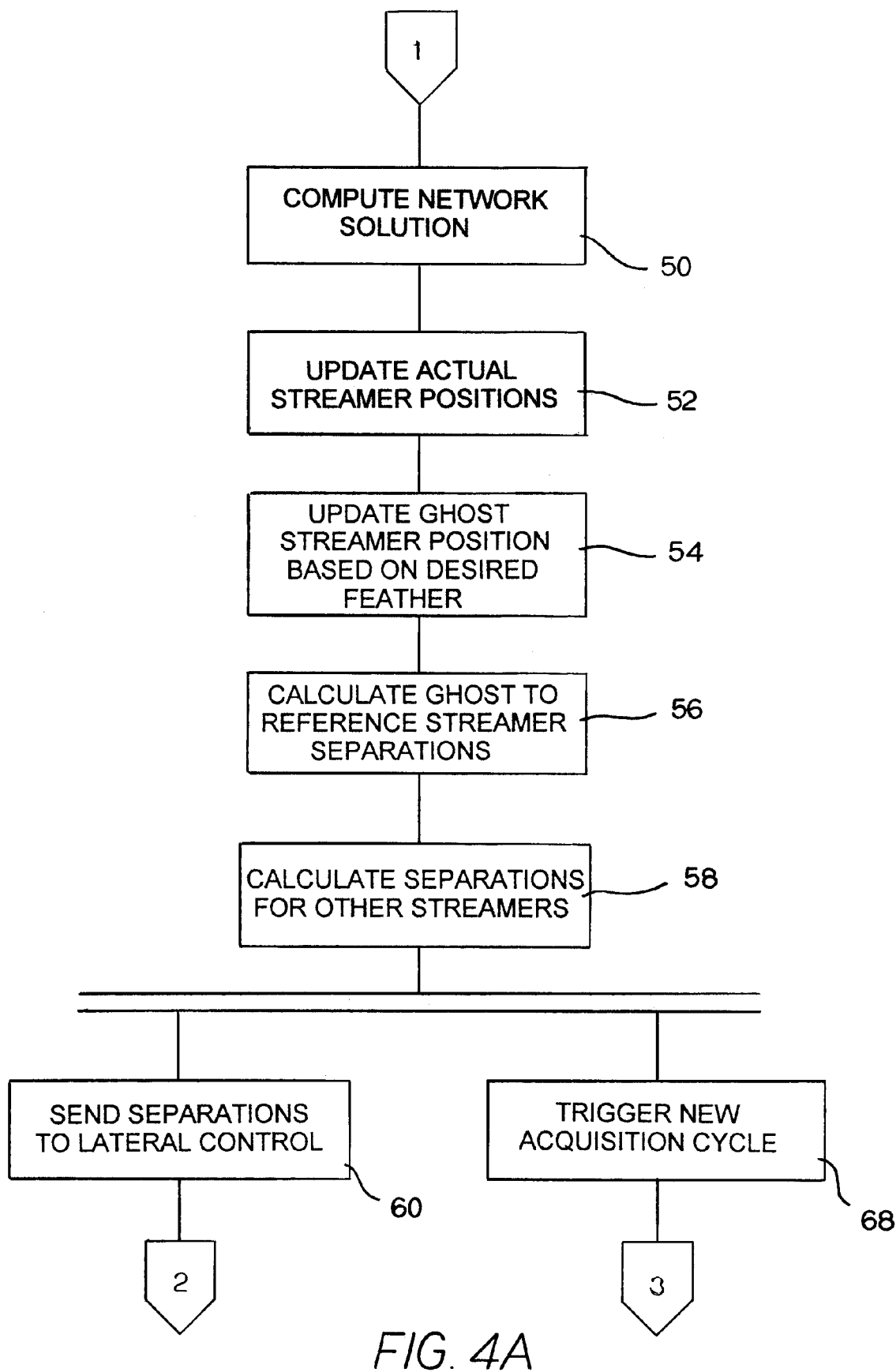
FIGS. 4A-4C are flowcharts of a control sequence for the control system of FIG. 3.
Figures 4B, 4C:
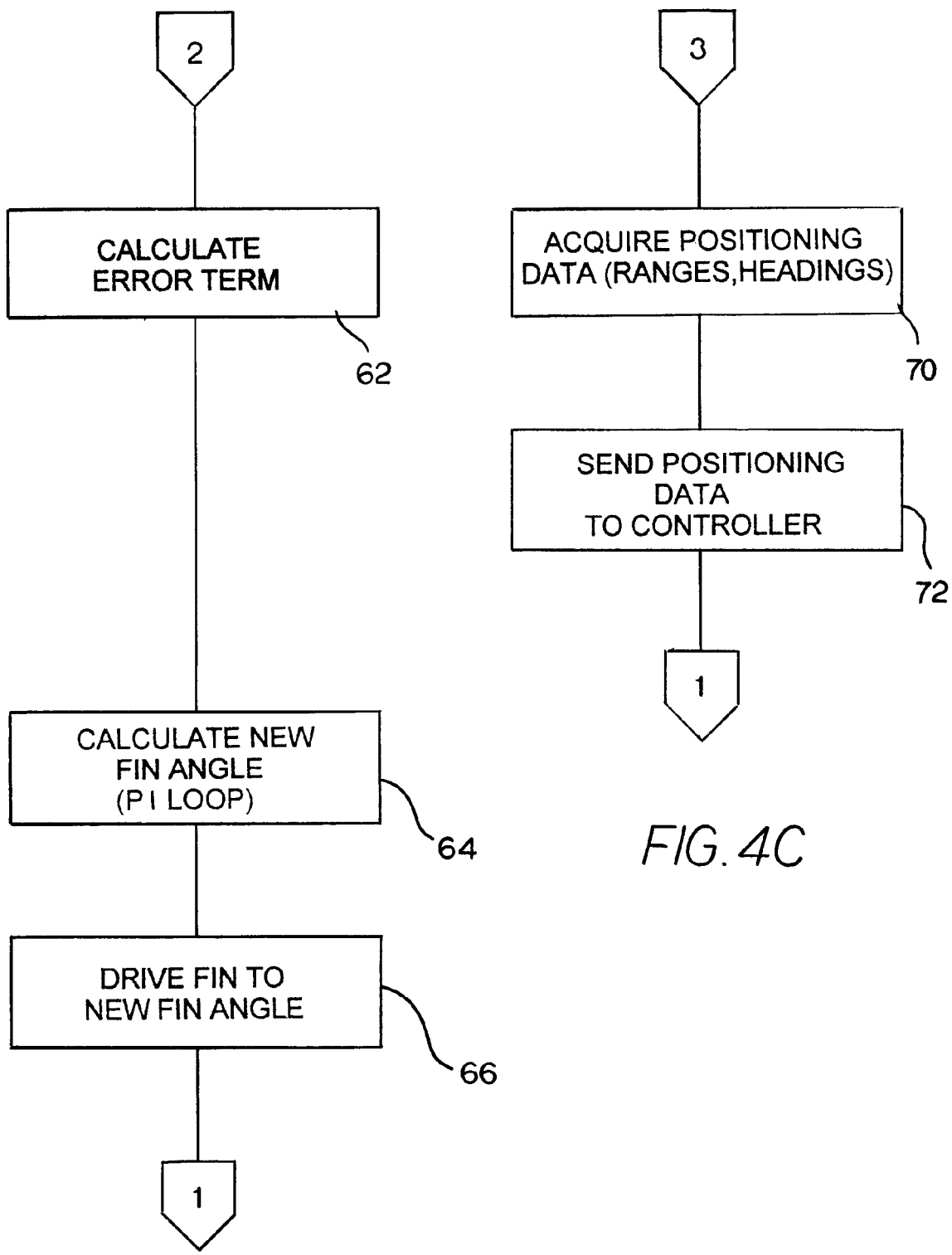

A flowchart of the streamer steering process that runs once each shot point online or at a regular interval offline and in turns is shown in FIGS. 4A-4C. First, the shipboard controller computes the network solution 50 from ranges gathered from the acoustic ranging devices and headings from the heading sensors. From the network solution, the actual streamer positions are updated 52. These steps are performed by the network calculator. Next, the auto-steering process updates the ghost streamer position from the desired feather 54. The network calculator then calculates the ghost-to-reference-streamer separation 56 (for example, between each node on $S_1$ and its closest point of approach to $G_1$) and the separations from each of the other actual streamers to a neighboring streamer 58 (between nodes on $S_n$ and their closest points of approach to $S_{n-1}$). Once the separations at each node in the network are calculated, the lateral steering interface, as controlled by the control user interface sends 60 the separations to the lateral controller.

The lateral controller calculates 62 lateral separation-error terms corresponding to the separations of a lateral steering device from one or more actual or ghost streamers. 62. Closed-loop controls, such as proportional-integral (PI) control loops, calculate 64 new fin angles for the devices' control surfaces, or fins. A motor in each steering device drives the fins to the new fin angle 66. While the lateral steering devices are being controlled to steer the streamers, the shipboard controller triggers a new data acquisition cycle 68 during which the position sensors (heading sensors and acoustic ranging devices) acquire streamer position data (headings and acoustic ranges) 70. The position sensors then send 72 the position data over the communications link to the controller for the network calculator to compute the network solution during the next positioning data update cycle, typically once per shot online and at some regular rate when running offline or in turns between lines.

Although the invention has been described with reference to a preferred version, other versions are possible. For example, the PI control loops that run in the shipboard lateral controller could be performed, for example, individually in each of the steering devices on the streamers. In that case, the steering devices would receive the necessary separation values from the shipboard controller in a command message. As yet another example, the system described is adaptable to a multi-vessel survey, in which most of the shipboard controller functions are performed by a master controller aboard one of the vessels linked to slave controllers aboard the other vessels. The slave controllers would be devoted largely to interfacing with the positioning-sensors and lateral steering devices. The master controller would perform most of the other functions, such as computing the complete network solution, defining the track for each streamer, and defining the ghost streamer for each vessel's streamer network. A radio or other wireless communication link would allow the master controller to communicate with the slaves on the other vessels. As another example, the block diagram defines a number of discrete blocks performing specific functions. The names of these blocks and the functions they perform were arbitrarily assigned to simplify the description of the system. The various processes may be distributed across blocks in many ways to similar effect. So, as these few examples suggest, the scope of the claims is not meant to be limited to the preferred version described in detail.

What is claimed is:

1. A system for controlling the spread of a plurality of streamers towed behind a survey vessel, comprising:
   a plurality of actual streamers towed by a survey vessel and having head ends laterally offset from each other, each actual streamer having a plurality of lateral steering devices and position sensors disposed along its length;
   a controller receiving position data from the position sensors and determining the shapes and positions of the actual streamers from the position data, calculating the shape and position of an imaginary streamer towed by the survey vessel, calculating lateral separations between one of the actual streamers, nominated a reference actual streamer, and the imaginary streamer, calculating lateral separations for each of the other actual streamers referenced to the shape and position of the reference actual streamer, and sending lateral steering commands corresponding to the calculated lateral separations to the lateral steering devices on the actual streamers.

2. The system of claim 1 wherein the controller calculates lateral separations between each of the other of the actual streamers and the reference actual streamer.

3. The system of claim 1 wherein the controller calculates lateral separations between each of the actual streamers and an adjacent actual streamer.

4. A method for controlling the spread of N actual streamers $S_1$-$S_N$ towed in the water behind a survey vessel and equipped with lateral steering devices at spaced apart locations along the lengths of the actual streamers, comprising:
   defining the shape and position of an imaginary streamer $G_r$;
   determining the shapes and positions of actual streamers $S_1$-$S_N$;
   sending lateral steering commands to lateral steering devices on actual reference streamer $S_r$ to adjust the separation in the water of actual reference streamer $S_r$ from imaginary streamer $G_r$;
   sending lateral steering commands from the controller to lateral steering devices on actual streamer $S_n$ to adjust the separation in the water of actual streamer $S_n$ from another actual streamer $S_i$, for every n∈{1, 2, ..., N} and n≠r and wherein i∈{1, 2, ..., N}, i≠n, and, in at least one case, i=r.

5. The method of claim 4 wherein i=n−1.

6. The method of claim 5 wherein actual streamers $S_1$ and $S_N$ are outermost actual streamers on opposite sides of the spread and actual streamers $S_2$-$S_{N-1}$ are sequentially offset laterally between the outermost actual streamers.

7. The method of claim 4 further comprising defining the shapes and positions of N imaginary streamers $G_1$-$G_N$ corresponding to actual streamers $S_1$-$S_N$.

8. The method of claim 4 wherein the shape and position of the imaginary streamer $G_r$ is determined from the required track and from feather data.

9. The method of claim 4 wherein the shape and position of the imaginary streamer $G_r$ is determined and the separations of the actual streamers $S_1$-$S_N$ are adjusted to control the spread of the streamers during deployment and retrieval.

10. The method of claim 4 wherein the shape and position of the imaginary streamer $G_r$ is determined and the separations of the actual streamers $S_1$-$S_N$ are adjusted to minimize the need for later infill.

* * * * *